Patented Nov. 27, 1951

2,576,308

UNITED STATES PATENT OFFICE 2,576,308

COATING COMPOSITIONS AND METHOD OF MAKING

Peter Nordon, Bondi Junction, near Sydney, New South Wales, Australia, assignor to Industrial Metal Protectives, Inc., Wilmington, Del., a corporation of Delaware No Drawing. Application September 30, 1948, Serial No. 52,129. In Australia October 2, 1947

13 Claims. (Cl. 106—84)

The present invention concerns improvements in and relating to coating compositions and method of making and, more particularly, to coating compositions of the zinc dust-alkali silicate type, for use on metal surfaces.

Coating compositions of this type are in a state of delicate equilibrium, primarily owing to two factors, namely:

(1) There is a relatively high concentration of silicic acid present as a colloidal solution which readily precipitates as a gel; and (2) The zinc dust is in an extremely fine state of division and is highly susceptible to attack by the alkaline silicate.

The coating produced by these zinc dust-alkali silicate mixes is, finally, tough and insoluble, and is thought to be due to a chemical or physical combination between the zinc dust and the silicate. Thus it is known that an alkali silicate by itself or an alkali silicate to which an inert pigment has been added, such as carbon black, produces a coating which is still soluble even after baking at 250° F. On the contrary, if zinc dust, especially if it is very finely divided, is added to the silicate, then baking to 250° F. will produce substantial insolubility. It is, therefore, clear that the mixes should not be modified in any way which will render the iznc inert to the alkali silicate, since if this were done a tough insoluble coating could not be obtained.

As previously mentioned, the zinc dust in the usual zinc dust-alkali silicate compositions is attacked rapidly by the alkali silicate, hydrogen being evolved. This is known in the trade as "frothing," and is a serious disadvantage since a mix which has frothed is found in practice to be unsuitable for use as a coating composition.

The films or coatings produced by compositions which have frothed have poor adhesion. Furthermore the mixture thickens rapidly and finally sets in a relatively short time. Consequently it is necessary to use the coating composition shortly after mixing. This requires that the zinc dust and alkali silicate be packed in separate containers, the two being mixed as required. Even so, it is not always possible to gauge accurately the amount of coating composition required for the particular job in hand, and as a result there is generally considerable wastage.

It is, therefore, an object of this invention to provide a coating composition of the zinc dust alkali-silicate type which does not need to be used immediately after mixing, and which will keep for comparatively long periods of time after mixing before setting.

It is another object of this invention to provide a coating composition of the alkali silicate-zinc dust type which can be easily be applied to metal surfaces to form a firm coat even though the coating composition is being applied a relatively considerable time after the coating composition was made up.

It is a still further object of this invention to provide a method of preparing an improved coating composition of the zinc dust alkali-silicate type which can easily be practiced and will create a coating composition which will keep for a relatively long period of time before setting.

According to this invention, a coating composition comprises a mixture of zinc dust and alkali silicate characterised by the addition thereto of a higher oxide of an element, or a compound formed from a higher oxide.

A known coating composition having the following composition:

Zinc dust _____grams__ 100
Sodium silicate (density)
  1.3:Na$_2$O:SiO$_2$=1:2.5) _____millilitres__ 31 when kept at room temperature becomes unsuitable for application within two to three hours of mixing, and sets solid in six to seven hours. It is known that the addition of small amounts of red lead, up to approximately 1% based upon the weight of the zinc dust, to such mixes, will increase both the life of the mix and the period before partial setting occurs, whilst the addition of red lead in amounts greater than about 3% causes rapid setting of the mix. Thus a composition as given above to which 5 grams of red lead had been added was likewise unsuitable for use after 2 to 3 hours, and set solid in 6 to 7 hours.

The terms "life" and "partially set" have the following meanings when used in this specification. By the word "life" is meant the period during which the mix substantially retains its original painting consistency. After this period the mix may still be suitable for application as a coating but may need thinning with water to give painting consistency. By "partially set" is meant that lumps have begun to form in the mix. Mixes which have "partially set" can sometimes be used by grinding, as in a ball mill, and thinning with water to painting consistency, but are likely to give unsatisfactory coatings.

It has now been found that if small amounts of the higher oxides of some elements, or compounds formed from such oxides, such as hydrogen peroxide, lead peroxide, barium peroxide, sodium perborate, potassium chlorate, potassium periodate, and sodium persulphate, are added to coating compositions of the zinc dust-alkali silicate type, "frothing" is reduced, and the time required for gelation of the mix is substantially increased. The mixes obtained are considerably superior to mixes to which a small amount of red lead has been added.

The preferred higher oxide is lead peroxide, and as little as 1% by weight based upon the weight of zinc dust in the mixture will give satisfactory results, while as much as 100% may be added. High proportions of lead peroxide are not desirable for most purposes, however, as the salt water resistance of the coating decreases with increase in lead peroxide content, and, in general, the proportion of lead peroxide should lie between 0.05% and 10%. The preferred percentage of lead peroxide is 2%.

It should be noted that lead peroxide ($PbO_2$) acts quite differently to red lead in these mixes. Thus lead peroxide does not cause rapid setting when present in large quantities, and, in fact, the storage characteristics of the mixes increase with increase in the proportion of lead peroxide. This should be contrasted with the characteristics of mixes containing red lead, which have a maximum life for amounts of red lead equal to approximately 1% by weight of the zinc dust, and falling off rapidly for larger amounts of red lead.

The useful range of the higher oxides referred to above is as set out below, the weight of the higher oxide being expressed as a percentage of the weight of zinc dust in the mix.

Barium peroxide, 0.1 to 5%
Sodium perborate, 0.05 to 5%
Potassium periodate, 0.005 to 1%
Potassium chlorate, 0.05 to 5%
Manganese dioxide, 0.5 to 3%
Hydrogen peroxide (100 volumes strength), 0.05 to 1 millilitre per 100 grams of zinc dust.

Example I

The present preferred mix containing lead peroxide is made up as follows:

Zinc dust _____grams__ 98
Sodium silicate (S. G.=1.3; $Na_2O:SiO_2$=1:2.6)
ml__ 31
Lead peroxide _____grams__ 2

The life of this mix is approximately 1 week, and it partially sets in approximately three weeks.

Example II

A preferred mix containing barium peroxide is as follows:

Zinc dust _____grams__ 99.5
Sodium silicate (S. G.=1.3; $Na_2O:SiO_2$=1:2.6)
ml__ 31
Barium peroxide _____grams__ 0.5

This mix had a life of 3½ days approximately.

Example III

A mix containing sodium perborate may have the following composition:

Zinc dust _____grams__ 100
Sodium silicate (S. G.=1.3; $Na_2O:SiO_2$=1:2.6)
ml__ 31
Sodium perborate ($NaBO_3$) _____gram__ 0.25

This mix had a life of 3½ days approximately. This is an example where the added compound, sodium perborate, is a compound formed from a higher oxide of an element, in this case from a higher oxide of boron.

Example IV

A mix having the following composition:

Zinc dust _____grams__ 100
Sodium silicate (S. G.=1.3; $Na_2O:SiO_2$=1:2.6)
ml__ 31
Sodium persulphate ($Na_2OS_2O_3$) ____gram__ 1 had a life of 2 weeks.

Example V

A mix having the following composition, namely

Zinc dust _____grams__ 98
Sodium silicate (S. G.=1.3; $Na_2O:SiO_2$=1:2.6)
ml__ 31
Potassium chlorate ($KClO_3$) _____grams__ 2 had a life of 2 days.

Example VI

A mix having the following composition, namely

Zinc dust _____grams__ 100
Potassium periodate ($KIO_4$) _____gram__ 0.25
Sodium silicate (S. G.=1.3; $Na_2O:SiO_2$=1:2.6)
ml__ 31 had a life of 6 weeks.

Example VII

A mix having the following composition, namely

Zinc dust _____grams__ 98
Sodium silicate (S. G.=1.3; $Na_2O:SiO_2$=1:2.6)
ml__ 31
Manganese dioxide _____gram__ 1 had a life of 6 hours.

Example VIII

Zinc dust _____grams__ 100
Sodium silicate (S. G.=1.3; $Na_2O:SiO_2$=1:2.6)
ml__ 31
Hydrogen peroxide solution (strength=100 volumes) _____ml__ 0.25

This mix frothed slightly at first, presumably due to liberation of oxygen from the hydrogen peroxide. After frothing had ceased the mix had a life of 12 days.

If the proportion of hydrogen peroxide is increased then the initial frothing becomes heavier, and this, in general, is undesirable. Accordingly it is not considered desirable to increase the hydrogen peroxide above 1 millilitre to each 100 grams of zinc dust. The quantity of hydrogen peroxide used may lie between 0.05 and 1 millilitre of 100 volume strength per 100 grams of zinc.

It has been found that the action of the higher oxides, or compounds formed by them, when added to zinc dust-alkali silicate mixes may be adversely affected by additions of other compounds. For example, red lead and lead chromate adversely affect the action of lead dioxide if the red lead or lead chromate is present in the mix in other than small amounts, for example, in amounts greater than approximately 5%. Accordingly compounds which promote setting should not be added to the mix in proportions which destroy the desired effect of the added higher oxides.

It is thought that the higher oxides, or compounds formed from them react with the zinc dust to form a coating of zinc oxide on the surface of the zinc particles, thereby delaying or slowing down the reaction between the zinc and alkali silicate. The zinc dust may be regarded as altered from its highly active initial state to one of relative passivity. As mentioned previously, a completely unreactive pigment will not give the desired reaction with an alkali silicate to produce a hard, insoluble, and tenacious coating. Accordingly the zinc dust must not be rendered too passive by the added higher oxide, or the coating produced from the composition will lose its tough tenacious character. It is desirable, therefore, that a correct balance of passivity be obtained to still allow some reaction with the silicate on baking and yet prevent undesirable reactions in the mix before application as a coating. The amount of higher oxide (or compound formed therefrom) which may be added without producing too great passivity can only be determined by experiment. In general, however, as the power of the oxide or compound as an oxidising agent increases, the amount which may be added decreases. Not all oxidising agents are suitable for this invention, apparently because they are too vigorous as oxidising agents, presumably causing too great passivity of the zinc dust.

However, it is possible that the higher oxides or their compounds in the mix act in another way, namely, by reacting with the hydrogen formed, thereby oxidising it whilst in the nascent state and thus preventing frothing.

The sodium silicate is preferably of the type in which the $Na_2O:SiO_2$ ratio lies between 1:2.4 and 1:2.6 inclusive. However, this invention is not limited to compositions employing sodium silicates having ratios falling within this range. Higher ratios than 1:3.0 will give brittle coatings, however, and should be avoided for most purposes. The zinc dust used in the above examples had an average particle size of 2.5 microns, but the invention is not to be limited to the use of particles having that size. The mixes described in the above examples were all prepared and maintained at room temperature (approximately 60° F.).

It is, of course, understood that the present invention is not limited to the specific examples referred to in the specification but also comprises any coating compositions within the scope of the appended claims.

I claim:

1. A coating composition comprising in combination, a mixture of zinc dust and an aqueous solution of alkali metal silicate having a ratio of alkali metal oxide to silica lying between 1:2.4 and 1:3.0 by moles, and lead peroxide in the amount of from 0.5% to 10% by weight of the weight of zinc dust present in the mixture.

2. A coating composition comprising in combination, a mixture of zinc dust and an aqueous solution of alkali metal silicate having a ratio of alkali metal oxide to silica between 1:2.4 and 1/3.0 by moles, and barium peroxide in the amount of from 0.1% to 5% by weight of the weight of zinc dust present in the mixture.

3. A coating composition comprising in combination, a mixture of zinc dust and an aqueous solution of alkali metal silicate having a ratio of alkali metal oxide to silica between 1:2.4 and 1/3.0 by moles, and manganese dioxide in the amount of from 0.5% to 3% by weight of the weight of zinc dust present in the mixture.

4. A coating composition comprising in combination, a mixture of zinc dust and an aqueous solution of alkali metal silicate having a ratio of alkali metal oxide to silica between 1:2.4 and 1/3.0 by moles, and hydrogen peroxide of strength equal to 100 volumes lying between 0.05 and 1 millilitre for every 100 grams of zinc dust in the mixture.

5. A coating composition comprising in combination, a mixture of zinc dust and an aqueous solution of alkali metal silicate having a ratio of alkali metal oxide to silica between 1:2.4 and 1/3.0 by moles, and sodium perborate in the amount of from 0.05% to 5% by weight of the weight of zinc dust present in the mixture.

6. A method of preparing a coating composition containing zinc dust dispersed in an aqueous solution of alkali metal silicate which includes the steps of mixing 98 grams of zinc dust with 31 millilitres of the silicate having a specific gravity of 1.3 and in which the ratio of alkali metal oxide to silica defined in moles equals 1:2.6, and adding thereto 2 grams of lead peroxide.

7. A method of preparing a coating composition containing zinc dust dispersed in an aqueous solution of alkali metal silicate which includes the steps of mixing 99.5 grams of zinc dust with 31 millilitres of the silicate having a specific gravity of 1.3 and in which the ratio of alkali metal oxide to silica defined in moles equals 1:2.6, and adding thereto 0.5 grams of barium peroxide.

8. A method of preparing a coating composition containing zinc dust dispersed in an aqueous solution of alkali metal silicate which includes the steps of mixing 100 grams of zinc dust with 31 millilitres of the silicate having a specific gravity of 1.3 and in which the ratio of alkali metal oxide to silica defined in moles equals 1:2.6, and adding thereto 0.25 grams of sodium perborate ($NaBO_3$).

9. A method of preparing a coating composition containing zinc dust dispersed in an aqueous solution of alkali metal silicate which includes the steps of mixing 98 grams of zinc dust with 31 millilitres of the silicate having a specific gravity of 1.3 and in which the ratio of alkali metal oxide to silica defined in moles equals 1:2.6, and adding thereto 1 gram of manganese dioxide.

10. A method of preparing a coating composition containing zinc dust dispersed in an aqueous solution of alkali metal silicate which includes the steps of mixing 100 grams of zinc dust with 31 millilitres of the silicate having a specific gravity of 1.3 and in which the ratio of alkali metal oxide to silica defined in moles equals 1:2.6, and adding thereto 0.25 millilitre of hydrogen peroxide solution of a strength equal to 100 volumes.

11. A liquid coating composition comprising a dispersion of zinc dust in an aqueous solution of alkali metal silicate and a higher oxide selected from the group consisting of hydrogen peroxide, lead peroxide, barium peroxide, sodium perborate, potassium chlorate, potassium periodate, manganese dioxide and sodium persulphate, said higher oxide being present in a minor proportion effective to prevent frothing and to increase the life of the mixture, the ratio of alkali metal oxide to silica defined in moles being 1:2.4 to 1:3.0.

12. A liquid coating composition comprising a dispersion of zinc dust in an aqueous solution of alkali metal silicate having a ratio of alkali oxide to silica lying between 1:2.4 and 1:3.0 by moles, and lead peroxide in the amount of .05% to 100% by weight of the weight of zinc dust present in the dispersion, said lead peroxide being effective to prevent frothing and to increase the life of the mixture.

13. A method of preparing a coating composition containing zinc dust dispersed in an aqueous solution of alkali metal silicate having a ratio of alkali metal oxide to silica defined in moles of 1:2.4 to 1:3.0, which includes the step of adding to the mixture of zinc dust and alkali metal silicate to prevent frothing and increase the life of the mixture, a minor proportion of a higher oxide selected from the group consisting of hydrogen peroxide, lead peroxide, barium peroxide, sodium perborate, potassium chlorate, potassium periodate, manganese dioxide and sodium persulphate.

PETER NORDON.

REFERENCES CITED

The following references are of record in the file of this patent:

UNITED STATES PATENTS

| Number | Name | Date |
|---|---|---|
| 2,440,969 | Nightingall | May 4, 1948 |
| 2,462,763 | Nightingall | Feb. 22, 1949 |
| 2,509,875 | MacDonald | May 30, 1950 |

FOREIGN PATENTS

| Number | Country | Date |
|---|---|---|
| 15,131 | Australia | 1929 |
| 104,231 | Australia | 1938 |